March 10, 1942.　　　L. YOUNG ET AL　　　2,276,007
BURR REMOVING DEVICE
Filed May 13, 1940
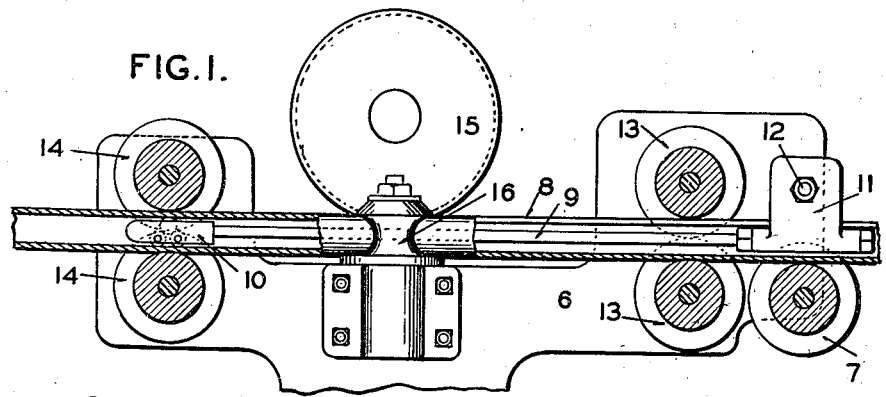
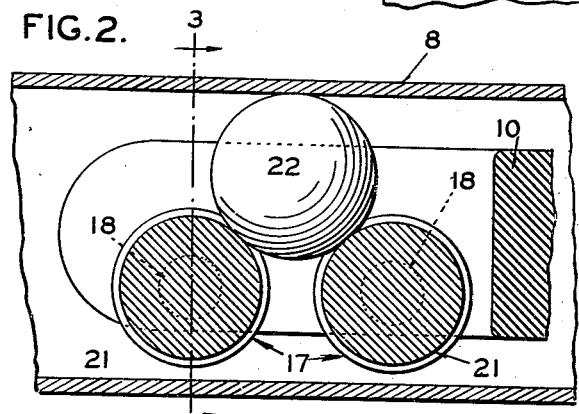
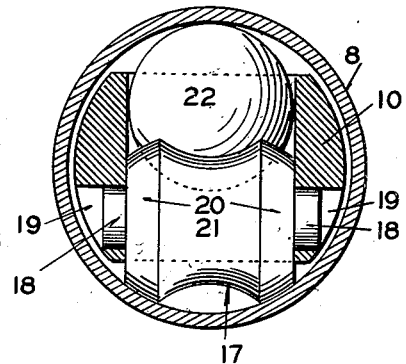
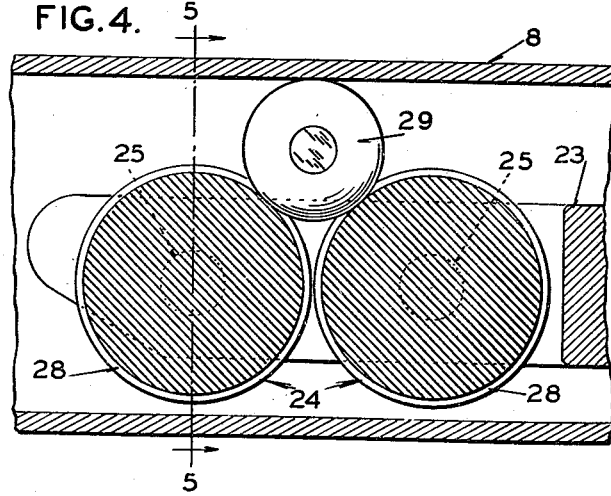
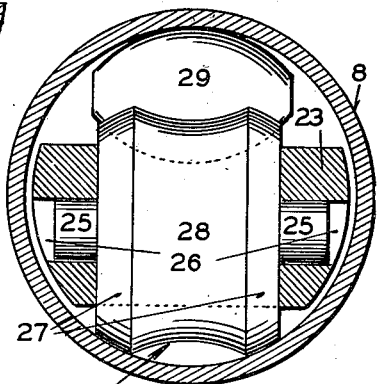
INVENTORS
LAFE YOUNG
ALFRED A. BOYLE
BY
*[signature]*
ATTORNEY Patented Mar. 10, 1942

2,276,007

UNITED STATES PATENT OFFICE 2,276,007

BURR REMOVING DEVICE

Lafe Young and Alfred A. Boyle, Alton, Ill., assignors to Laclede Steel Company, St. Louis, Mo., a corporation of Missouri Application May 13, 1940, Serial No. 334,794

6 Claims. (Cl. 80—11)

Our invention relates to apparatus for welding a tube or pipe from a strip of metal or skelp which is rolled around a mandrel. More specifically our invention pertains to improvements in the mandrel of such a device for smoothing the projection formed on the interior of the pipe by the welding operation.

In all devices of this class of which we are aware, the smoothing roll for operating on the seam is journaled in the mandrel, the latter being positioned in the tube by a supporting roll or rolls also journaled therein. The object of our invention is to provide a mandrel in which the smoothing operation is performed by a floating rotary smoothing element which is not journaled in the mandrel but is carried solely by a pair of grooved supporting rolls. This construction permits the use of large supporting rolls with large trunnions to provide a strong and durable structure. Further the smoothing element when worn may be quickly replaced without the use of tools and different sizes of elements may be employed to adapt the mandrel for use with tubes of varying size.

In the drawing Figure 1 is a semi-diagrammatic side view, partly in section, illustrating one form of welding machine embodying our invention; Figure 2 is a longitudinal section showing the mandrel in position in a tube; Figure 3 is a section taken on the line 3—3 of Figure 2; Figure 4 is a view similar to Figure 2, but showing a modification; and Figure 5 is a section taken on the line 5—5 of Figure 4.

Referring first to Figure 1, the numeral 6 indicates the frame of a welding machine. Carried by the frame is a supporting roll 7 for the tube 8. Within the latter is a shaft 9 carrying a mandrel 10. The shaft is carried by a bracket 11 projecting through the open seam of the tube and secured to the frame by a bolt 12. In addition to the supporting roll 7 the frame carries a pair of shaping rolls 13 and a pair of feed rolls 14. Power is applied to the latter to feed the tube through the machine by any suitable gearing (not shown). Positioned between the rolls 13 and 14 are contact rolls 15 for supplying electric current to make the weld and pressure rolls 16 for forcing the edges of the seam into intimate contact at this point. The shaft 9 is of such length as to extend past the point of weld and position the mandrel 10 between the feed rolls 14.

The mandrel 10 is in the form of a bifurcated frame between the arms of which are positioned a pair of supporting rolls 17. Each of these rolls is provided with a pair of trunnions 18 journaled in openings 19 in the arms of the frame. Each of the rolls 17 is provided at the ends with curved bearing surfaces 20 for contact with the pipe and with an intermediate curved groove 21 for the support of the ball 22 which contacts the interior surface of the tube at the point of weld to smooth out the fin or projection formed thereon by the welding operation.

In Figures 4 and 5 we have shown a modification in which the mandrel 10 is replaced by a mandrel 23, which like the mandrel 10 is in the form of a bifurcated frame. Between the arms of this frame are positioned supporting rolls 24 which are of the same general conformation as the rolls 17 heretofore described. They have trunnions 25 journaled in openings 26 in the arm of the frame 23 and are provided with curved end bearing surfaces 27 and an intermediate curved groove 28. In this form the ball 22 is replaced by a roll 29. The roll is in the form of a circular spindle having a curvature approximating that of the inner surface of the tube. This permits greater width of contact with the face of the tube than is secured by the use of the ball.

In the use of our device the inner face of the tube is operated upon along the line of weld while the tube is still hot from the welding operation and comparatively soft. The fin or projection formed at the line of seal is thus effectively smoothed out. While we have shown our invention in connection with a well known type of electric welding machine it may be employed with other machines whether the welding is performed electrically or otherwise.

Having fully described our invention, what we claim as new and desire to secure by Letters Patent of the United States is:

1. In a device of the class described, a mandrel for cooperating with the interior of a tube having a welded longitudinal seam; a pair of supporting rolls journaled in the mandrel, and a floating rotary smoothing element carried on the rolls and contacting with the interior of the tube along the line of seam to smooth out the fin formed by the welding operation.

2. In a device of the class described, a mandrel for cooperating with the interior of a tube having a welded longitudinal seam, a pair of supporting rolls journaled in the mandrel, and a ball carried on the rolls and contacting with the interior of the tube along the line of seam to smooth out the fin formed by the welding operation.

3. In a device of the class described, a mandrel for cooperating with the interior of a tube having a welded longitudinal seam, a pair of supporting rolls journaled in the mandrel, and a floating smoothing roll carried directly on the supporting rolls alone, said smoothing roll being in the form of a circular spindle and contacting with the interior of the tube along the line of seam to smooth out the fin formed by the welding operation.

4. In a device of the class described, a mandrel for cooperating with the interior of a tube having a welded longitudinal seam, a pair of supporting rolls journaled in the mandrel, said rolls each having a pair of curved end faces contacting with the pipe and an intermediate curved groove, and a floating rotary smoothing element carried in the grooves in said rolls and contacting with the interior of the tube to smooth out the fin formed by the welding operation.

5. In a device of the class described, a mandrel for cooperating with the interior of a tube having a welded longitudinal seam, a pair of supporting rolls journaled in the mandrel, said rolls each having a pair of curved end faces contacting with the pipe and an intermediate curved groove, and a ball carried in the grooves in said rolls and contacting with the interior of the tube along the line of seam to smooth out the fin formed by the welding operation.

6. In a device of the class described, a mandrel for cooperating with the interior of a tube having a welded longitudinal seam, a pair of supporting rolls journaled in the mandrel, said rolls each having a pair of curved end faces contacting with the pipe and an intermediate curved groove, and a smoothing roll carried in the grooves in the supporting rolls, said smoothing roll being in the form of a circular spindle and contacting with the interior of the tube along the line of seam to smooth out the fin formed by the welding operation.

LAFE YOUNG.
ALFRED A. BOYLE.